United States Patent [19]

Foster

[11] Patent Number: 4,826,524

[45] Date of Patent: May 2, 1989

[54] APPARATUS FOR HOLDING MOULD SIDE PORTIONS IN A GLASSWARE FORMING MACHINE

[75] Inventor: Thomas V. Foster, S.Yorks, England

[73] Assignee: Emhart Industries, Inc., Farmington, Conn.

[21] Appl. No.: 71,457

[22] Filed: Jul. 8, 1987

[30] Foreign Application Priority Data

Jul. 26, 1986 [GB] United Kingdom ............... 8618315

[51] Int. Cl.⁴ .................. C03B 9/353; C03B 11/06
[52] U.S. Cl. ................................. 65/323; 65/357; 65/360
[58] Field of Search .............. 65/232, 237, 238, 240, 65/264, 307, 323, 357–361

[56] References Cited

U.S. PATENT DOCUMENTS

| | | | |
|---|---|---|---|
| 3,472,639 | 10/1969 | Mumford | 65/360 |
| 3,607,207 | 9/1971 | Dahms et al. | 65/357 |
| 3,617,233 | 11/1971 | Mumford | 65/360 |
| 3,666,433 | 5/1972 | Nebelung et al. | 65/360 |
| 3,721,545 | 3/1973 | Irwin | 65/360 |
| 3,798,019 | 3/1974 | Bystrianyk et al. | 65/360 |
| 4,449,996 | 5/1984 | Irwin et al. | 65/360 |
| 4,543,118 | 9/1945 | Nebelung | 65/359 |
| 4,585,469 | 4/1986 | Nebelung | 65/359 |
| 4,655,813 | 4/1987 | Nebelung | 65/359 |

Primary Examiner—Arthur Kellogg
Attorney, Agent, or Firm—Spencer T. Smith

[57] ABSTRACT

The apparatus is arranged to hold side portions of three equally-spaced moulds. The apparatus comprises two holders (2 and 4) for opposite side portions of the moulds. One holder (2) comprises a support (12) on which moving means for moving the holders to open and close the moulds acts, a first carrier (16) for one side portion pivotally mounted on the support (12) and a second carrier (18) for two side portions pivotally mounted on the first carrier (16). The pivotal connections between the support (12) and the first carrier (16) and the first (16) and second (18) carriers are separated by half the mould spacing to balance the mould closing force between the three moulds.

2 Claims, 1 Drawing Sheet

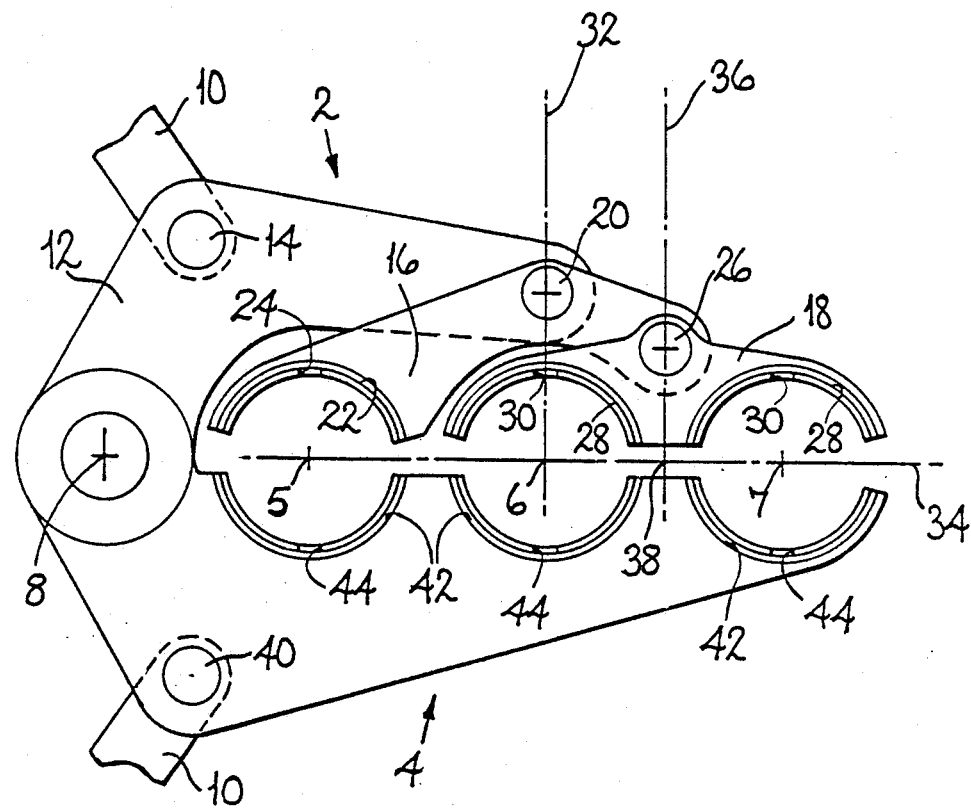

APPARATUS FOR HOLDING MOULD SIDE PORTIONS IN A GLASSWARE FORMING MACHINE

This invention is concerned with apparatus for holding mould side portions in a glassware forming machine.

In glassware forming machines, e.g. of the individual section or I.S. type, articles of glassware are moulded by moulds held by holding apparatus of the machine. The holding apparatus may support one, two, three or even four moulds in which articles are moulded simultaneously. The apparatus comprises a first holder by which a first side portion of the or each mould is held, a second holder by which a second, opposed, side portion of each mould is held, and moving means operable to move the first and the second holders towards one another into a closed position thereof, in which each mould side portion held by one of the holders engages a side portion held by the other holder and cooperates therewith in defining a mould cavity, or into an open position thereof, in which the mould side portions are separated from one another. In a machine of the individual section type, there are two such holding apparatuses located respectively at a parison-forming station and at a finish station of the machine. At the parison-forming station, when the holders are in their closed position, a gob of molten glass is introduced into each mould cavity and either blown or pressed to the shape of the cavity to thereby form a parison. The holders then move to their open position to allow parison removal. The parisons are moved to the finish station where the holders of the holding apparatus are moved to their closed positions so that a mould closes around each parison which is then in a mould cavity. The parisons are blown to the shape of the mould cavity, which is the shape of the required article, and the holders are then moved to their open positions to allow article removal.

Where a holding apparatus supports more than one mould, a problem arises in balancing the mould closing force available between the moulds so that, when the holders are in their closed position, each mould is firmly held closed against the tendency of the mould side portions to separate as a parison is pressed or blown or as an article is blown. Where there are two moulds, this problem is solved by providing that each holder comprises a support on which the moving means acts and a carrier arranged to carry the two mould side portions, the carrier being pivotally mounted on the support. The pivotal connection between the support and the carrier, when the holders are in their closed positions, being substantially on a line extending normally to a line joining the centres of the moulds and passing through a point halfway between the moulds. Thus, the carrier can pivot to equalise forces between the two moulds.

Where there are three equally-spaced moulds, however, the problem of pressure equalisation is more acute and has not hitherto been satisfactorily solved. In one construction (see U.S. Pat. No. 3,607,207), one holder has two carriers mounted on a support thereof, one (a double carrier) carrying two mould side portions and the other (a single carrier) carrying one side portion. The other holder is similarly constructed. The side portions of the centre mould are both carried by the double carriers. The side portions of the end moulds, however, are carried one by a double carrier and the other by a single carrier. The carriers are all pivotally mounted on supports of the holders with the pivots of the double carriers aligned with a point halfway between the mould centres of those moulds and the pivots of the single carriers aligned with a point halfway between that mould and the next (centre) mould. This construction does not operate to balance the forces between the moulds in a satisfactory manner. Indeed, even when full closing force is being applied, it is sometimes possible to remove the side portions of one mould from their carriers by hand.

Great Britain Patent Specification No. 2132187 describes a construction in which one holder has a centrally-pivoted carrier carrying three mould side portions while the other holder has two carriers pivotally mounted thereon each of which supports a side mould portion of an end mould and the two carriers cooperate in supporting the side portion of the central mould. This construction would be unsatisfactory because the two carriers of the second-mentioned holders could not operate independently as they cooperate in supporting a mould side portion.

European Patent Specification No. 0059573 describes a construction applicable to machines in which the holders move in a straight line but not to the more common arrangement in which the holders move arcuately about a common pivot. In this construction, a single carrier which is not pivoted is provided for three mould side portions and the opposed side portions are each supported by a separate carrier which is also not pivoted. The three single carriers are interconnected by a system of links which distribute the closing force between them. This construction is, however, relatively complex and, as above-mentioned, is not applicable to arcuately moving holders.

It is an object of the present invention to provide apparatus for holding mould side portions in a glassware forming machine which is arranged to hold the side portions of three equally-spaced moulds which is of simple construction and which applies a substantially equal closing force to each mould.

The invention provides apparatus for holding mould side portions in a glassware forming machine, the apparatus being arranged to hold the side portions of three equally-spaced moulds, the apparatus comprising a first holder by which a first side portion of each mould is held, a second holder by which a second side portion of each mould is held, and moving means operable to move the first and the second holders towards one another into a closed position thereof, in which each mould side portion held by one of the holders engages a side portion held by the other holder and cooperates therewith in defining a mould cavity, or into an open position thereof, in which the mould side portions are separated from one another, characterised in that the first holder comprises a support on which the moving means acts, a first carrier arranged to carry one mould side portion, and a second carrier arranged to carry two mould side portions, the first carrier being pivotally mounted on the support and the second carrier being pivotally mounted on the first carrier, the pivotal connection between the support and the first carrier, when the holders are in their closed positions, being substantially on a line extending normally to a line joining the centres of the moulds and passing through the centre of the centre mould and the pivotal connection between the first carrier and the second carrier being substantially on a line extending normally to a line joining the centres of the moulds and passing through a point halfway between the centre of the centre mould and the centre of the other mould whose side portion is carried by the second carrier.

In an apparatus according to the last preceding paragraph, the mould closing force is applied to the pivot between the support and the first carrier. As the reaction forces act at the centres of the mould, one-third of the closing force is transmitted to the mould portion carried by the first carrier and two-thirds is transmitted to the pivot between the first and the second carriers. This is because the effective distance between the pivot between the support and the first carrier and the mould side portion carried by the first carrier is twice the effective distance between the pivots. The force applied to the pivot between the first and the second carriers is equally distributed between the two mould side portions carried by the second carrier. Thus, each mould receives one third of the mould closing force, the construction beng simplified by the mounting of the second carrier on the first.

The force distribution function may be carried out entirely by the first holder in which case the second holder is arranged to hold three mould side portions in fixed relationship to one another, or the force distribution function may be shared between the holders in which case the second holder is of similar construction to the first holder.

There now follows a detailed description, to be read with reference to the accompanying drawing of an apparatus which is illustrative of the invention. It is to be understood that the illustrative apparatus has been selected for description by way of example and not of limitation of the invention.

The drawing is a plan view of the illustrative apparatus.

The illustrative apparatus is for holding mould side portions (not shown) in a glassware forming machine of the individual section type. The apparatus is arranged to hold the side portions of three equally-spaced moulds. The apparatus comprises a first holder 2 by which a first side portion of each mOuld is held and a second hOlder 4 by which a second side portion of each mould is held.

The illustrative apparatus also comprises moving means of conventional construction operable to move the first 2 and the second 4 holders towards one another into a closed position thereof (shown in the drawing), in which each mould side portion held by one of the holders 2,4 engages a side portion held by the other holder and cooperates therewith in defining a mould cavity in which moulding can take place. The centre points of the moulds, are indicated by 5 (left hand mould viewing the drawing), 6 (centre mould), and 7 (right hand mould). The moving means is also operable to move the holders 2,4 into an open position thereof (not shown) in which the mould side portions are separated from one another. The movement of the holders 2,4 between their open and closed positions is arcuate about a pivot pin 8 on which both holders are pivotally mounted. The moving means which, as aforementioned, is of conventional construction moves links 10 which are pivotally connected to the holders 2,4 to cause the holders to pivot about the pin 8 either towards or away from one another.

The first holder 2 comprises a support 12 which is in the form of an arm pivotally mounted on the pin 8 and projecting horizontally therefrom. The support 12 is pivotally connected to one of the links 10 by a pin 14 mounted on the support 12 so that the moving means acts on the support 12. The holder 2 also comprises a first carrier 16 arranged to carry one mould side portion (belonging to the mould centred at 5), and a second carrier 18 arranged to carry two mould side portions (belonging to the moulds centred at 6 and 7).

The first carrier 16 is pivotally mounted on the support 12 on a pin 20. The first carrier 16 projects horizontally away from the pin 20 towards the pin 8 and has an arcuate groove 22 in its upper surface into which a hook portion of the mould side portion can be fitted to mount the side portion on the carrier 16 in conventional fashion. A locating projection of the mould side portion fits into a slot 24 which enters the groove 22 also in conventional fashion. The first carrier 16 also supports a pivot pin 26 further from the pin 8 than the pin 20. The second carrier 18 is pivotally mounted on the pin 26 so that the second carrier 18 is pivotally mounted on the first carrier 16. The second carrier 18 has two arcuate grooves 28 in its upper surface, similar to the groove 22, on which mould side portions of the moulds centred on 6 and 7 can be mounted in conventional fashion. Slots 30, similar to the slot 24 enter the grooves 28.

The pin 20 forming the pivotal connection between the support 12 and the first carrier 16, when the holders 2 and 4 are in their closed positions, is substantially on a line 32 extending normally to a line 34 joining the centres 5,6 and 7 of the moulds and passing through the centre 6 of the centre mould. The pin 26 forming the pivotal connection between the first carrier 16 and the second carrier 18 is substantially on a line 36 extending normally to the line 34 and passing through a point 38 halfway between the centre 6 of the cenrre mould and the centre 7 of the other mould whose side portion is carried by the second carrier 18.

When the holders 2 and 4 are in their closed positions, the mould closing force applied by the moving means acts along the line 32 passing through the pin 20 and the centre 6. As the distance along the line 34 between the centres 5 and 6 is twice that between the centre 6 and the point 38, one third of the closing force acts on the mould side portion mounted on the groove 22 of the first support 16 and two-thirds acts on the pin 26 along the line 36. The force acting on the pin 26 is equally distributed between the two mould side portions mounted on the grooves 28 of the second support 18 as the distance along the line 34 between the centre 6 and the point 38 is equal to that between the centre 7 and the point 38. Thus, each mould side portion receives one third of the mould closing force.

The second holder 4 is arranged to hold three mould side portions in fixed relationship to one another in opposed relationship to the mould side portions held by the first holder 2. The second holder 4 is in the form of an arm pivotally mounted on the pin 8 and projecting horizontally therefrom. The holder 4 is pivotally connected to one of the links 10 by a pivot pin 40 so that the moving means acts on the holder 4 as aforementioned. The holder 4 also has three arcuate grooves in its upper surface 42 (similar to the grooves 22 and 28) with slots 44 (similar to the slots 24 and 30) so that the mould side portions can be mounted on the holder 4.

I claim:

1. A triple gob individual section glassware forming machine for carrying out glassware forming processes in three molds which are formed by forcefully clamping together opposing mold halves comprising:
   a pivotally mounted lower mold support for receiving three mold halves ,
   a pivotally mounted upper support arm, a first upper mold support for receiving the innermost mold, means for pivotally mounting said first upper mold support on said upper support arm, a second upper mold support for receiving the outer two molds, and means for pivotally mounting said second upper mold support on said first upper mold support, the pivot mountings on said first and second upper mold supports being selectively located so that when clamping occurs between the lower mold support and said first and second upper mold supports clamping forces will be equally applied to the three molds.

2. A triple gob individual section glass forming machine according to claim 1 further comprising means for rotatively displacing said support arm.

* * * * *